(12) United States Patent
Kang et al.

(10) Patent No.: US 8,860,320 B2
(45) Date of Patent: Oct. 14, 2014

(54) LED DRIVER APPARATUS

(75) Inventors: Tae-kyoung Kang, Cheongju-si (KR);
Chang-sik Lim, Cheongju-si (KR);
Eun-ah Ko, Cheongju-si (KR);
Beom-seon Ryu, Cheongju-si (KR)

(73) Assignee: Magnachip Semiconductor, Ltd., Cheongju-si (KR)

( * ) Notice: Subject to any disclaimer, the term of this patent is extended or adjusted under 35 U.S.C. 154(b) by 121 days.

(21) Appl. No.: 13/586,089

(22) Filed: Aug. 15, 2012

(65) Prior Publication Data
US 2013/0049614 A1 Feb. 28, 2013

(30) Foreign Application Priority Data

Aug. 30, 2011 (KR) ........................ 10-2011-0087459

(51) Int. Cl.
*H05B 37/03* (2006.01)
*H05B 33/08* (2006.01)
*H05B 37/02* (2006.01)
*G09G 3/34* (2006.01)

(52) U.S. Cl.
CPC .............. *H05B 37/02* (2013.01); *Y02B 20/346* (2013.01); *G09G 2320/064* (2013.01); *H05B 33/086* (2013.01); *H05B 33/0818* (2013.01); *H05B 33/0887* (2013.01); *G09G 3/3406* (2013.01)

USPC ........................... 315/186; 315/307; 315/122

(58) Field of Classification Search
CPC ...... H05B 37/02; H05B 37/03; H05B 37/032; H05B 37/036
USPC .......................... 315/186, 122, 291, 307, 312
See application file for complete search history.

(56) References Cited

U.S. PATENT DOCUMENTS

| 7,550,934 | B1 | 6/2009 | Deng et al. | |
| 7,675,245 | B2 * | 3/2010 | Szczeszynski et al. | ........ 315/291 |
| 8,044,609 | B2 * | 10/2011 | Liu | ................................ 315/291 |
| 2010/0289424 | A1 * | 11/2010 | Chang et al. | ................... 315/250 |

* cited by examiner

*Primary Examiner* — Daniel D Chang
(74) *Attorney, Agent, or Firm* — NSIP Law

(57) ABSTRACT

A Light Emitting Diode (LED) driver apparatus is provided. The LED driver apparatus includes: a Pulse Width Modulation (PWM) signal generator configured to generate a PWM signal, a DC-DC converter configured to provide a driving voltage of a plurality of LED arrays by using the generated PWM signal, and a sensor configured to determine whether at least one LED array among the plurality of LED arrays is in an open state in response to the driving voltage being higher than or equal to a preset first reference voltage, and the preset first reference voltage is higher than the driving voltage applied when the plurality of LED arrays are each in a working state.

18 Claims, 5 Drawing Sheets

LED DRIVER APPARATUS

CROSS-REFERENCE TO RELATED APPLICATION(S)

This application claims the benefit under 35 U.S.C. §119 of Korean Patent Application No. 10-2011-0087459, filed on Aug. 30, 2011, in the Korean Intellectual Property Office, the entire disclosure of which is incorporated herein by reference for all purposes.

BACKGROUND

1. Field

The following description generally relates to a Light Emitting Diode (LED) driver apparatus and, for example, to an LED driver apparatus that is capable of sensing whether an LED array circuit is in an open state.

2. Description of Related Art

A Liquid Crystal Display (LCD) is thinner and lighter than many other types of display apparatuses. In addition, LCDs generally have lower driving voltage and consume less power than many other types of display apparatuses. Therefore, LCDs have been widely used. However, the liquid crystal panel of an LCD is a non-emitting device that does not emit light by itself. Thus, an LCD requires an additional backlight for supplying light to its liquid crystal panel.

A Cold Cathode Fluorescent Lamp (CCFL), a Light Emitting Diode (LED), and the like, are mainly used in a backlight unit (BLU) of an LCD. However, CCFLs utilize mercury; thus, CCFLs raise environmental concerns. In addition, CCFLs have slow response speed and low color representation. Thus, CCFLs are inappropriate for making an LCD that is light-weight, thin, short, or compact in size.

LEDs do not use a harmful material such as mercury; thus, they are environment-friendly in that sense. In addition, LEDs enable impulse driving. Also, a backlight unit comprising LEDs may exhibit high color representation. The amount of light from red (R), green (G), and blue (B) diodes of an LED backlight unit may be adjusted to freely change the luminance, color temperature, and the like of the emitted light. Accordingly, the luminance, color temperature and the like of an LCD using LEDs can be adjusted to a desired value, such as a predetermined value or a value that closely matches the image that is being reproduced. Thus, LEDs are appropriate for making an LCD that is light-weight, thin, short, and/or small. Therefore, LEDs have been widely used as a backlight source of an LCD and other display devices.

In an LCD backlight unit having LED arrays that each include a plurality of LEDs connected to one another, a driving circuit is often used to provide a constant current to each of the LED arrays, and a dimming circuit is often used to adjust the luminance, color temperature, and the like, to a desired value or to compensate for the color temperature and the like of the emitted light.

In such an LCD backlight unit, the circuits of LED arrays may frequently fail open with respect to a LED driver apparatus due to a physical impact to the device, an over-heating due to prolonged use, and the like, causing the backlight unit to malfunction or to deteriorate in performance. Accordingly, a protection circuit is desirable to sense whether any of the circuits of LED arrays has failed open.

However, based on an abnormal forward voltage generated either at an initial driving or by a peak current of a constant current, a conventional protection circuit may determine that the circuits of LED arrays are open, when the circuits are actually not in an open state.

For example, if the LED arrays are initially turned on, a forward voltage of the LED array may suddenly increase, causing a large increase in voltage. The large differences in the magnitude of voltages are frequently used to determine whether an LED array circuit is in an open state. For instance, a conventional protection circuit may determine a large voltage difference between the forward voltages Vf of the LED arrays to detect an LED array that has failed open. In determining that one LED array has failed open, the backlight unit may generate a driving voltage by excluding the LED array having the large voltage difference. As a result, the LED array having the large voltage difference may no longer operate in a normal manner.

In addition, the forward voltage of the LED array is frequently temporarily lowered to a value close to 0V due to a peak current of a constant current source. The conventional protection circuit may detect this change as indicating that the circuit of an LED array has failed open. In such an event, a driving voltage is generated by excluding the forward voltage of the corresponding LED array that is determined to be in an open state, preventing the corresponding LED array from operating in a normal manner.

SUMMARY

In one general aspect, there is provided a Light Emitting Diode (LED) driver apparatus including: a Pulse Width Modulation (PWM) signal generator configured to generate a PWM signal, a DC-DC converter configured to provide a driving voltage of a plurality of LED arrays by using the generated PWM signal, and a sensor configured to determine whether at least one LED array among the plurality of LED arrays is in an open state in response to the driving voltage being higher than or equal to a preset first reference voltage, in which the preset first reference voltage is higher than a driving voltage applied when the plurality of LED arrays are each in a working state.

The preset first reference voltage may be a maximum output voltage of the DC-DC converter.

The sensor may be configured to determine that an LED array is in an open state in response to a forward voltage of the LED array being lower than a preset second reference voltage when the driving voltage is higher than or equal to the preset first reference voltage, and the preset second reference voltage may be lower than the forward voltage of the LED array when the plurality of LED arrays are each in a working state.

The sensor may include: a comparator configured to compare the forward voltage of the LED array with the preset second reference voltage, and a determiner configured to determine whether the LED array is in an open state, according to an output of the comparator when the driving voltage is higher than or equal to the preset first reference voltage.

The LED driver apparatus may further include: a pulse generator configured to generate a sensing pulse in response to the driving voltage being higher than or equal to the preset first reference voltage, and the determiner may be a data flip-flop configured to receive the sensing pulse as a clock signal and the output of the comparator as a data signal.

The LED driver apparatus may further include: a reference voltage generator configured to measure the forward voltages of the plurality of LED arrays and to provide a reference voltage corresponding to the LED array having the lowest one of the measured forward voltages to the PWM signal generator, and a switching unit configured to selectively provide the forward voltages of the plurality of LED arrays to the reference voltage generator according to whether at least one LED array of the plurality of LED arrays is in an open state.

In another general aspect, there is provided an Light Emitting Diode (LED) driver apparatus including: a Pulse Width Modulation (PWM) signal generator configured to generate a PWM signal, a DC-DC converter configured to provide a driving voltage of an LED array based on the generated PWM signal, and a sensing unit configured to determine whether the LED array is in an open state in response to the driving voltage being higher than or equal to a preset first reference voltage, in which the preset first reference voltage is higher than the driving voltage applied when the LED array is in a working state.

The preset first reference voltage may be a maximum output voltage of the DC-DC converter.

The LED driver apparatus may further include: a pulse generator configured to generate a sensing pulse in response to the driving voltage being higher than or equal to the preset first reference voltage, and the sensing unit may include: a first comparator configured to compare the forward voltage of the LED array with a preset second reference voltage, and a first data flip-flop configured to receive the sensing pulse as a clock signal and an output of the first comparator as a data signal, and the preset second reference voltage may be lower than the forward voltage of the LED array when the LED array is in a working state.

In yet another general aspect, there is provided a Liquid Crystal Display (LCD) including: a liquid crystal panel, and a backlight unit including an LED driver apparatus described above.

In another general aspect, there is provided a method of driving an LCD backlight unit, the method including: generating a Pulse Width Modulation (PWM) signal, providing a driving voltage to a plurality of LED arrays of the LCD backlight unit based on the generated PWM signal, and determining whether at least one LED array among the plurality of LED arrays is in an open state in response to the driving voltage being higher than or equal to a preset first reference voltage, in which the preset first reference voltage is higher than a driving voltage applied when the plurality of LED arrays are each in a working state.

An LED array may be determined to be in an open state in response to a forward voltage of the LED array being lower than a preset second reference voltage when the driving voltage is higher than or equal to the preset first reference voltage, and the preset second reference voltage may be lower than the forward voltage of the at least one LED array when the plurality of LED arrays are each in a working state.

A comparator may be used to compare the forward voltage of the at least one LED array with the preset second reference voltage, and the at least one LED array may be determined to be in an open state based on an output of the comparator when the driving voltage is higher than or equal to the preset first reference voltage.

The method may further include: generating a sensing pulse in response to the driving voltage being higher than or equal to the preset first reference voltage, and a data flip-flop may receive the sensing pulse as a clock signal and the output of the comparator as a data signal.

The method may further include: measuring the forward voltages of the plurality of LED arrays and providing a reference voltage corresponding to an LED array having the lowest measured forward voltage to a PWM signal generator, and selectively providing the forward voltages of the plurality of LED arrays to a reference voltage generator according to whether at least one LED array of the plurality of LED arrays is in an open state.

Other features and aspects may be apparent from the following detailed description, the drawings, and the claims.

Figure 1:
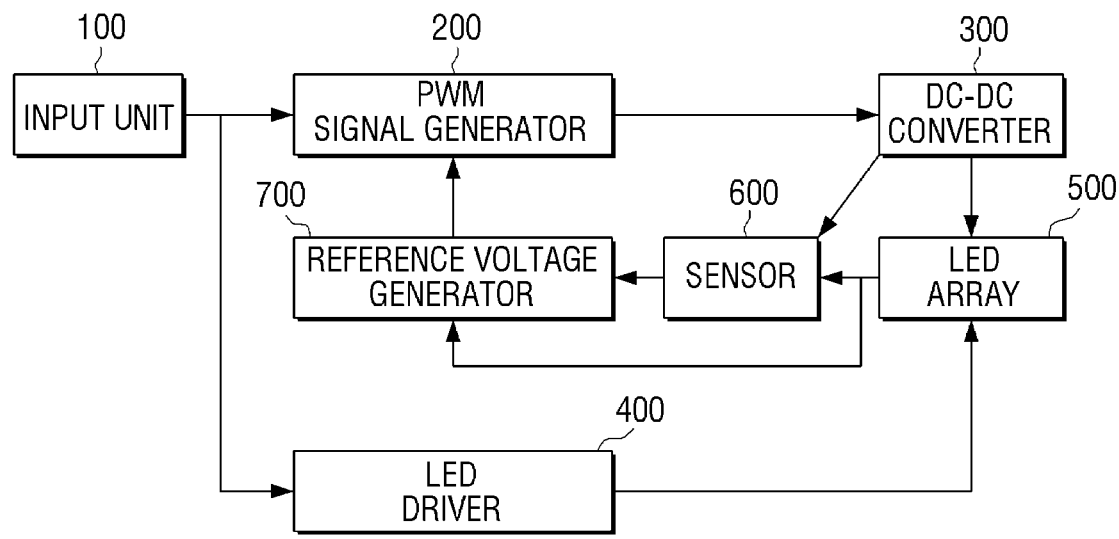
FIG. 1 is a diagram illustrating a structure of an example of a Light Emitting Diode (LED) driver apparatus.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the systems, apparatuses and/or methods described herein will be suggested to those of ordinary skill in the art. Also, descriptions of well-known functions and constructions may be omitted for increased clarity and conciseness.

FIG. 1 illustrates a structure of an example of a Light Emitting Diode (LED) driver apparatus 1000.

Referring to FIG. 1, the LED driver apparatus 1000 includes an input unit 100, a Pulse Width Modulation (PWM) signal generator 200, a DC-DC converter 300, an LED driver 400, an LED array 500, a sensor 600, and a reference voltage generator 700.

The input unit 100 may receive a dimming signal for driving the LED array 500. Examples of digital dimming methods that may be used for an LED backlight unit include a direct mode, a fixed phase mode, and a phase shift mode. A direct mode refers to a mode in which a Packet Assembler/Disassembler (PAD) controls both a PWM frequency and an on-duty signal. A fixed phase mode and a phase shift mode refer to modes in which an Integrated Circuit (IC) internally generates the PWM frequency, and the PAD receives and controls only the on-duty signal. A dimming signal refers to a signal that is used to adjust luminances, color temperatures, etc. of LEDs or to compensate for the color temperature of an LED backlight unit. In this example, a direct mode is used to receive the dimming signal from an external source. However, this is provided only as an example for illustrative purposes, and in other examples, the dimming signal may be received in a mode such as, for instance, the fixed phase mode or the phase shift mode.

The PWM signal generator 200 generates a PWM signal according to a reference voltage. For example, the PWM signal generator 200 may generate a PWM signal that controls a level of a driving voltage of the DC-DC converter 300, according to the reference voltage generated by the reference voltage generator 700. The reference voltage generator 700 is described later with reference to FIG. 3.

The DC-DC converter 300 includes a transistor that performs a switching operation and provides the driving voltage to the LED array 500 according to the switching operation of the transistor. For example, the DC-DC converter 300 may convert a DC voltage based on the PWM signal generated by the PWM signal generator 200 and may provide the converted DC voltage (i.e., the driving voltage) to the LED array 500. The DC-DC converter 300 may provide a voltage corresponding to a forward bias voltage of the LED array 500 to the LED array 500 so that the LED array 500 may operate in a range of current saturation.

In this example, the LED driver 400 provides a constant current that drives the LED array 500, by using the dimming signal. For example, the LED driver 400 may adjust a level of a driving current of the LED array 500 by using the dimming signal to provide the adjusted constant current (i.e., the driving current) to the LED array 500. The structure and operation of the LED driver 400 are described later with reference to FIG. 2.

In response to the driving voltage being higher than or equal to a preset first reference voltage, the sensor 600 determines whether the circuit of LED array 500 is in an open state. For example, if a forward voltage of the LED arrays 500 is lower than a preset second reference voltage when the driving voltage is higher or equal to the preset first reference voltage, the sensor 600 may determine that at least one of the LED arrays 500 is in an open state. In this case, the preset first reference voltage is a voltage that is higher than the driving voltage provided to the LED array 500 from the DC-DC converter 300 when the LED array 500 operates in a normal manner. Here, operating in a normal manner refers to a state in which the LED arrays 500 are each in a working state, without any having failed open. For example, the preset first reference voltage may be a maximum output voltage of the DC-DC converter 300. In addition, the preset second reference voltage is a voltage that is lower than the forward voltage of the LED array 500 when the LED array 500 operates in a normal manner, without having failed. A manufacturer may select voltage values optimized through an experiment as the preset first and second reference voltages, and the levels of the preset first and second reference voltages may be thereafter changed according to a system.

As described above, the sensor 600 may be used to determine whether one LED array has failed open. However, in the event that the LED driver apparatus 1000 drives a plurality of LED arrays, the sensor 600 may be used to determine whether two or more LED arrays are in an open state, as well as which arrays are in an open state. For instance, one sensor 600 may be used to determine whether two or more LED arrays are in an open state. In the alternative, a plurality of sensors may be used to determine whether one corresponding LED array is in an open state.

The reference voltage generator 700 generates the reference voltage. For example, the reference voltage generator 700 may measure forward voltages of the plurality of LED arrays and may provide the PWM signal generator 200 with a reference voltage corresponding to the LED array having the lowest voltage among the measured forward voltages. In this example, the forward voltages of the LED arrays are selectively provided to the reference voltage generator 700 according to the determinations made by the sensor 600 as to whether any of the LED arrays are in an open state.

As described above, the LED driver apparatus 1000 may accurately sense whether the circuit of LED array 500 is in an open state, regardless of the presence of an abnormal forward voltage.

Figure 2:
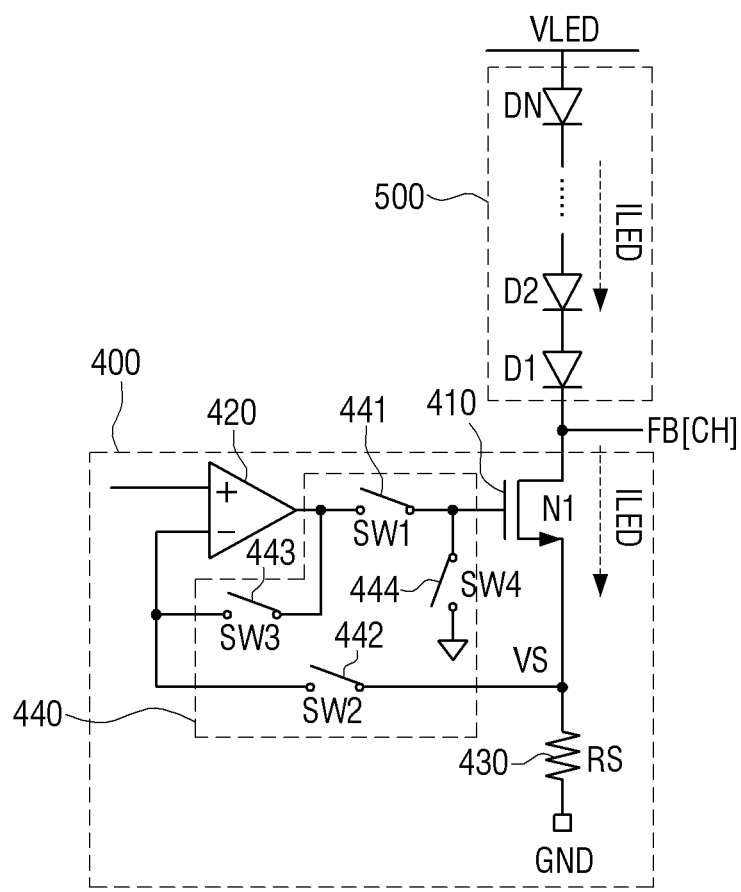
FIG. 2 is a circuit diagram of an LED driver apparatus illustrated in FIG. 1.

FIG. 2 illustrates a circuit diagram of an example of an LED driver 400.

Referring to FIG. 2, the LED driver 400 includes a transistor 410, a comparator 420, a resistor 430, and a switching unit 440.

The transistor 410 performs a switching operation according to an output signal of the comparator 420 and a connection state of the switching unit 440. For example, the transistor 410 includes a drain connected to an end of the LED array 500, a source connected to the resistor 430, and a gate connected to an output node of the comparator 420 through the switching unit 440. In this example, the transistor 410 is implemented with an NMOS transistor. However, this example is provided only for illustrative purposes, and in other examples, the transistor 410 may be implemented with other types of transistors.

The comparator 420 compares a voltage $V_S$ of a common node that the switching unit 440 and the resistor 430 commonly contact, with a preset reference voltage $V_{REF}$ to control the transistor 410. For example, the comparator 420 may be implemented with an operational amplifier (OP-AMP). In the case that the comparator 420 is implemented with an OP-AMP, a positive terminal of the comparator 420 may receive the reference voltage $V_{REF}$, a negative terminal of the comparator 420 may receive the voltage $V_S$ of the command node, and an output node of the comparator 420 may be connected to the gate of the transistor 410 through the switching unit 440.

One end of the resistor 430 may be connected to the source of the transistor 410, and an other end may be grounded.

The switching unit 440 may selectively provide the output signal of the comparator 420 to the transistor 410 according to an expanded dimming signal. In this example, the switching unit 440 includes first, second, third, and fourth switches 441, 442, 443, and 444.

The first switch 441 is disposed between the comparator 420 and the gate of the transistor 410. The first switch 441 is in a closed state when the expanded dimming signal is turned on, and it is in an open state when the expanded dimming signal is turned off.

The second switch 442 is disposed between the negative terminal of the comparator 420 and a common node of the source of the transistor 410 and the resistor 430. The second switch 442 is in a closed state when the expanded dimming signal is turned on, and it is in an open state when the expanded dimming signal is turned off.

The third switch 443 is disposed between the negative terminal and the output node of the transistor 410. The third switch 443 is in an open state when the expanded dimming signal is turned on, and in a closed state when the expanded dimming signal is turned off.

The fourth switch 442 is disposed between the gate of the transistor 410 and a ground node. The fourth switch 442 is in an open state when the expanded dimming signal is turned on, and in a closed state when the expanded dimming signal is turned off.

Therefore, if the expanded dimming signal is turned on, the first and second switches 441 and 442 are in a closed state, and the third and fourth switches 443 and 444 are in an open state. As a result, the comparator 420 compares the voltage $V_S$ of the common node between the switching unit 410 and the resistor 430 with the preset reference voltage $V_{REF}$ to control the transistor 410.

If the expanded dimming signal is turned off, the first and second switches 441 and 442 are in an open state, and the third and fourth switches 443 and 444 are in a closed state. Therefore, the gate of the transistor 410 is connected to the ground node so that the transistor 410 interrupts a supply of a constant current to the LED array 500.

Figure 3:
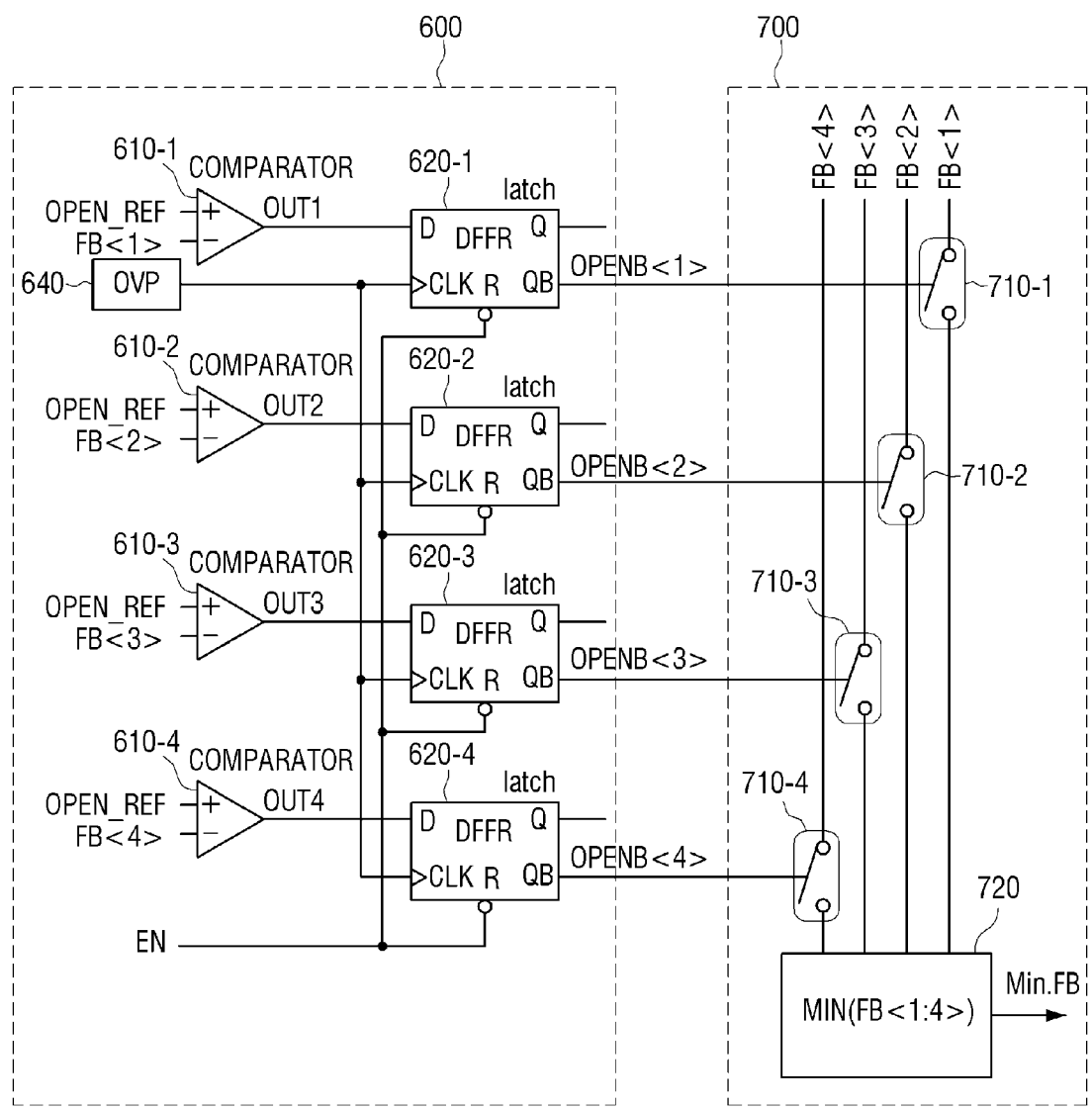
FIG. 3 is a circuit diagram of a sensor and a reference voltage generator illustrated in FIG. 1.

FIG. 3 illustrates a circuit diagram of the sensor 600 and the reference voltage generator 700 of FIG. 1.

Referring to FIG. 3, the sensor 600 includes a plurality of comparators 610-1, 610-2, 610-3, and 610-4, a plurality of determiners 620-1, 620-2, 620-3, and 620-4, and a pulse generator 640.

The plurality of comparators 610-1, 610-2, 610-3, and 610-4 respectively compare forward voltages of a plurality of LED arrays with a preset second reference voltage. In this example, the comparators 610-1, 610-2, 610-3, and 610-4 may be respectively OP-AMPs which receive the second reference voltage through positive terminals, receive the forward voltages of the LED arrays through negative terminals, and output differences between the second reference voltage and the forward voltages.

A plurality of determiners 620-1, 620-2, 620-3, and 620-4 respectively may be used to determine whether the LED arrays are in an open state, according to outputs of the comparators 610-1, 610-2, 610-3, and 610-4 in response to the driving voltage being higher than or equal to a preset first reference voltage. For example, the plurality of determiners 620-1, 620-2, 620-3, and 620-4 may respectively be data flip-flops that receive pulses as clock signals and receive the outputs of the comparators 610-1, 610-2, 610-3, and 610-4 as data signals.

In the illustrated example, the determiners 620-1, 620-2, 620-3, and 620-4 are implemented with data flip-flops. However, in other examples, the determiners 620-1, 620-2, 620-3, and 620-4 may be implemented with other types of flip-flops besides the data flip-flops.

If the driving voltage is higher than or the equal to the preset first reference voltage, the pulse generator 640 generates a sensing pulse. For example, if the driving voltage of the DC-DC converter 300 is higher than or equal to the preset first reference voltage, the pulse generator 640 may generate the sensing pulse. In this example, the preset first reference voltage may be a voltage higher than the driving voltage when the LED arrays operate in a normal manner, without any of the LED array having failed open, or a maximum output voltage of the DC-DC converter 300. In the illustrated example, the pulse generator 640 is an element installed in the sensor 600. However, in other examples, the pulse generator 640 may be an element installed outside the sensor 600.

As described above, the sensor 600 may determine whether an LED array has been opened, when the LED array is actually in an open state (i.e., when the driving voltage is higher than or equal to the preset first reference voltage). Therefore, the sensor 600 may accurately sense whether the LED array 500 has failed open, regardless of the presence of an abnormal forward voltage.

The reference voltage generator 700 includes a selector 720 and a switching unit comprising a plurality of switches 710-1, 710-2, 710-3, and 710-4.

The plurality of switches 710-1, 710-2, 710-3, and 710-4 selectively provide forward voltages of a plurality of LED arrays to the selector 720 according to the determinations made by the sensor 600. For example, if the sensor 600 determined that a first LED array is in an open state, the plurality of switches 710-1, 710-2, 710-3, and 710-4 provide only forward voltages of second through fourth LED arrays to the selector 720 except a forward voltage of the first LED array. In this example, the switching unit is an element installed in the reference voltage generator 700. However, in other examples, the switching unit may be an element installed outside the reference voltage generator 700. Also, the selector 720 may perform functions of the plurality of switches 710-1, 710-2, 710-3, and 710-4. The selector 720 measures the forward voltages of the plurality of LED arrays and provides a reference voltage corresponding to the LED array having the lowest measured forward voltage to the PWM signal generator 200.

In FIG. 3, the LED driver apparatus 1000 is configured to determine whether any of the four LED arrays has failed open. However, in other examples, an LED driver apparatus may be configured to sense whether any of three or less or five or more LED arrays has failed open.

Figure 4:
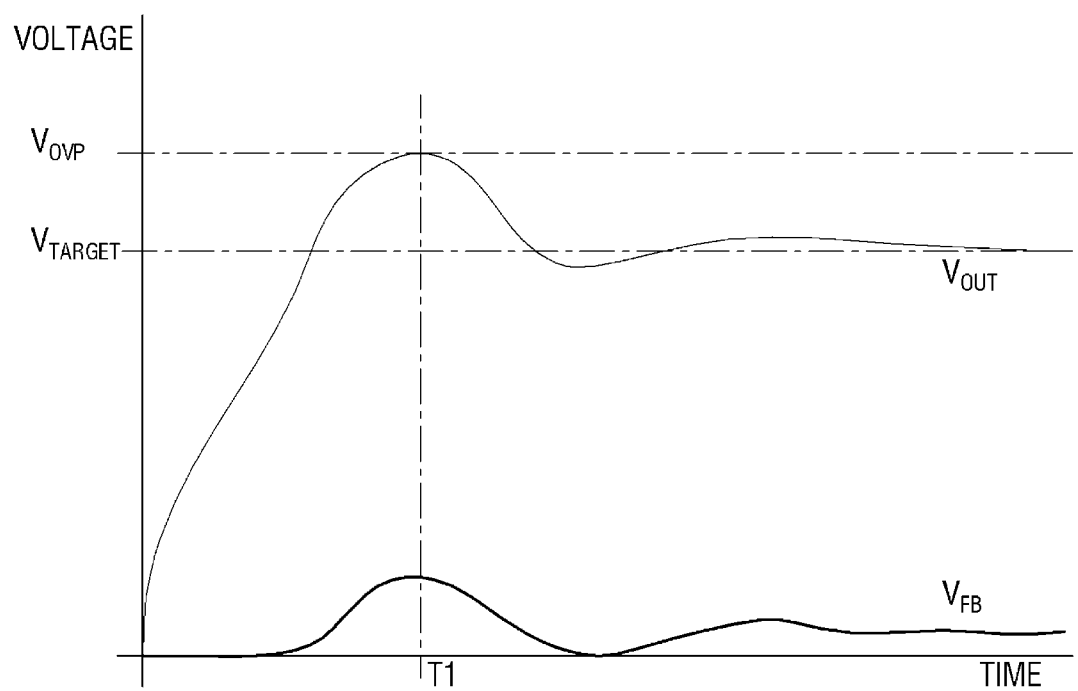
FIGS. 4 and 5 are waveforms that describe an operation of the LED driver apparatus illustrated in FIG. 1.

FIG. 4 illustrates a waveform that describes an operation of the LED driver apparatus 1000 in the event that an LED array has failed open.

If the LED driver apparatus 1000 is in an operating state when the LED array fails open, a forward voltage $V_{FB}$ of the opened LED array is reduced to a value close to 0V. Therefore, as shown in FIG. 4, the DC-DC converter 300 provides a maximum output voltage $V_{OUT}$ to the LED array simultaneously when the LED driver apparatus 100 is driven.

If the DC-DC converter 300 outputs the maximum output voltage $V_{OUT}$, the sensor 600 determines whether an LED array is in an open state. If it is determined that an LED array is in an open state, the reference voltage generator 700 generates a reference voltage by using only forward voltages of the other LED arrays without using the forward voltage of the opened LED array. Therefore, the DC-DC converter 300 provides a stable driving voltage to a plurality of LED arrays after a predetermined time elapses.

Figure 5:
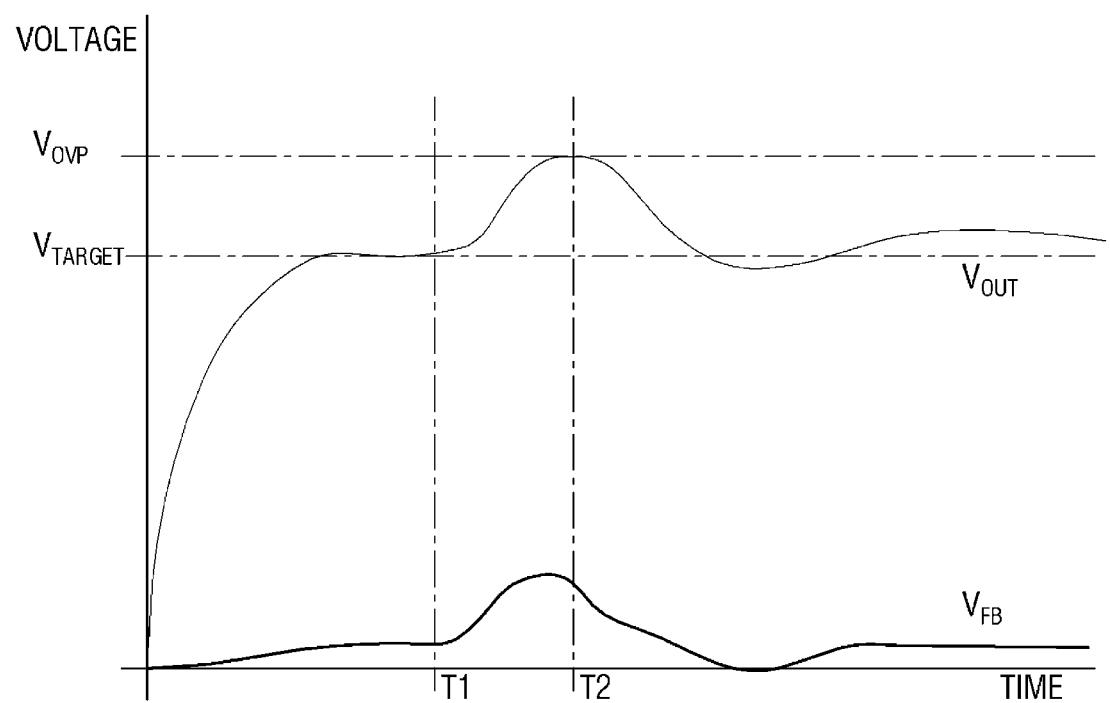

FIG. 5 illustrates a waveform that describes an operation of the LED driver apparatus 1000 in the event that an LED array circuit failed open while the LED driver apparatus 1000 is operating.

If the LED array circuit fails open while the LED driver apparatus 1000 is operating, the DC-DC converter 300 provides a maximum output voltage $V_{OUT}$ to a plurality of LED arrays due to the opened LED array.

If the DC-DC converter 300 generates the maximum output voltage $V_{OUT}$, the sensor 600 determines whether the LED array is in an open state. If it is determined that the LED array is in an open state, the reference voltage generator 700 generates a reference voltage by using only forward voltages of the LED arrays other than the opened LED array. Therefore, the DC-DC converter 300 may provide a stable driving voltage to a plurality of LED arrays after a predetermined time elapses.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A Light Emitting Diode (LED) driver apparatus comprising:
   a Pulse Width Modulation (PWM) signal generator configured to generate a PWM signal;
   a DC-DC converter configured to provide a driving voltage to LED arrays using the generated PWM signal; and
   a sensor configured to determine whether an LED array among the LED arrays is in an open state based on the driving voltage being higher than or equal to a preset first reference voltage,
   wherein the preset first reference voltage is higher than the driving voltage in response to the LED arrays being in a working state.

2. The LED driver apparatus of claim 1, wherein the preset first reference voltage is a maximum output voltage of the DC-DC converter.

3. The LED driver apparatus of claim 1, wherein:
the sensor is further configured to determine the LED array is in an open state in response to a forward voltage of the LED array being lower than a preset second reference voltage, and
the preset second reference voltage is lower than the forward voltage of the LED array in response to the LED arrays being in a working state.

4. The LED driver apparatus of claim 3, wherein the sensor comprises:
a comparator configured to compare the forward voltages of the LED arrays with the preset second reference voltage; and
a determiner configured to determine whether the LED array is in an open state, based on an output of the comparator and the driving voltage being higher than or equal to the preset first reference voltage.

5. The LED driver apparatus of claim 4, further comprising:
a pulse generator configured to generate a sensing pulse in response to the driving voltage being higher than or equal to the preset first reference voltage,
wherein the determiner is a data flip-flop configured to receive the sensing pulse as a clock signal and the output of the comparator as a data signal.

6. The LED driver apparatus of claim 1, further comprising:
a reference voltage generator configured to
measure the forward voltages of the LED arrays, and
provide a reference voltage corresponding to an LED array having the lowest measured forward voltage to the PWM signal generator; and
a switching unit configured to selectively provide the forward voltages of the LED arrays to the reference voltage generator based on whether each LED array among the LED arrays is in an open state.

7. A Liquid Crystal Display (LCD) comprising:
a liquid crystal panel; and
a backlight unit comprising an LED driver apparatus of claim 1.

8. The LED driver apparatus of claim 1, further comprising:
an LED driver configured to provide a constant driving current that drives the LED arrays, wherein the LED driver adjusts a level of the driving current based on a dimming signal.

9. An Light Emitting Diode (LED) driver apparatus comprising:
a Pulse Width Modulation (PWM) signal generator configured to generate a PWM signal;
a DC-DC converter configured to provide a driving voltage to an LED array based on the generated PWM signal;
a sensing unit configured to determine whether the LED array is in an open state in response to the driving voltage being higher than or equal to a preset first reference voltage; and
a pulse generator configured to generate a sensing pulse in response to the driving voltage being higher than or equal to the preset first voltage,
wherein the preset first reference voltage is higher than the driving voltage in response to the LED array being in a working state.

10. The LED driver apparatus of claim 9, wherein the preset first reference voltage is a maximum output voltage of the DC-DC converter.

11. The LED driver apparatus of claim 9,
wherein:
the sensing unit comprises
a first comparator configured to compare the forward voltage of the LED array with a preset second reference voltage, and
a first data flip-flop configured to receive the sensing pulse as a clock signal and an output of the first comparator as a data signal; and
the preset second reference voltage is lower than the forward voltage of the LED array in response to the LED array being in a working state.

12. The LED driver apparatus of claim 9, further comprising:
an LED driver configured to provide a constant driving current that drives the LED arrays, wherein the LED driver adjusts a level of the driving current based on a dimming signal.

13. A method of driving an LED backlight unit, the method comprising:
providing a driving voltage to LED arrays based on a Pulse Width Modulation (PWM) signal; and
determining whether an LED array among the LED arrays is in an open state in response to the driving voltage being higher than or equal to a preset first reference voltage,
wherein the preset first reference voltage is higher than a driving voltage applied in response to the LED arrays being in a working state.

14. The method of claim 13, further comprising generating the PWM signal based on a dimming signal from an external source.

15. The method of claim 14, further comprising:
determining whether the LED array is in an open state in response to a forward voltage of the LED array being lower than a preset second reference voltage,
wherein the preset second reference voltage is lower than the forward voltage of the LED array in response to the LED arrays being in a working state.

16. The method of claim 15, further comprising:
comparing the forward voltage of the LED array with the preset second reference voltage using a comparator; and
determining whether the LED array is in an open state based on an output of the comparator and the driving voltage being higher than or equal to the preset first reference voltage.

17. The method of claim 16, further comprising:
generating a sensing pulse in response to the driving voltage being higher than or equal to the preset first reference voltage, and
receiving the sensing pulse as a clock signal and the output of the comparator as a data signal at a data flip flop.

18. The method of claim 14, further comprising:
measuring the forward voltages of the LED arrays to determine an LED array having the lowest measured forward voltage.

* * * * *